US009231845B1

(12) United States Patent
Goldstein et al.

(10) Patent No.: US 9,231,845 B1
(45) Date of Patent: Jan. 5, 2016

(54) IDENTIFYING A DEVICE ASSOCIATED WITH A PERSON WHO DOES NOT SATISFY A THRESHOLD AGE

(71) Applicant: AUDIBLE, INC., Newark, NJ (US)

(72) Inventors: Douglas Scott Goldstein, Riverdale, NY (US); Ajay Arora, New York, NY (US); Douglas Cho Hwang, New York, NY (US); Guy Ashley Story, Jr., New York, NY (US)

(73) Assignee: Audible, Inc., Newark, NJ (US)

( * ) Notice: Subject to any disclaimer, the term of this patent is extended or adjusted under 35 U.S.C. 154(b) by 411 days.

(21) Appl. No.: 13/720,938

(22) Filed: Dec. 19, 2012

(51) Int. Cl.
*H04L 12/26* (2006.01)
(52) U.S. Cl.
CPC .................................. *H04L 43/16* (2013.01)
(58) Field of Classification Search
CPC ............................................... H04L 43/16
USPC ....................................................... 709/224
See application file for complete search history.

(56) References Cited

U.S. PATENT DOCUMENTS

| 5,550,575 | A | 8/1996 | West et al. |
| 7,921,036 | B1 | 4/2011 | Sharma et al. |
| 2007/0260603 | A1* | 11/2007 | Tuscano et al. ................... 707/9 |
| 2008/0141293 | A1 | 6/2008 | Blanchard et al. |
| 2009/0133051 | A1* | 5/2009 | Hildreth .......................... 725/28 |
| 2010/0048300 | A1* | 2/2010 | Capio ............................. 463/36 |
| 2010/0287584 | A1* | 11/2010 | Starikov et al. ................. 725/28 |
| 2011/0237324 | A1* | 9/2011 | Clavin et al. ................... 463/29 |
| 2013/0124328 | A1 | 5/2013 | Broadhead et al. |
| 2014/0150068 | A1* | 5/2014 | Janzer ............................. 726/4 |

OTHER PUBLICATIONS

U.S. Appl. No. 13/720,929, filed Dec. 2012, Douglas Goldstein et al.*

* cited by examiner

*Primary Examiner* — Brian J Gillis
*Assistant Examiner* — Steve Lin
(74) *Attorney, Agent, or Firm* — Knobbe Martens Olson & Bear LLP (57) ABSTRACT

A system is provided that identifies a device associated with a person who does not satisfy a threshold age. The system scans the digital media content of a content data store associated with the device and estimates an age threshold value of the files of the digital media content. Based on the estimated age threshold value of the files, the system determines that the device is used by a person who does not satisfy a threshold age and applies one or more content rules to a presentation of the digital media content. The content rules cause an alteration of the presentation of the digital media content.

19 Claims, 8 Drawing Sheets

IDENTIFYING A DEVICE ASSOCIATED WITH A PERSON WHO DOES NOT SATISFY A THRESHOLD AGE

BACKGROUND

An increasing amount of digital media content is available to users electronically. While the available digital media content may be acceptable to adults, in many instances, some content is not appropriate for children or adolescents due to language, violence, dialogue, drug use, indecency, etc. In some circumstances, an adult may be willing to watch or listen to age inappropriate content so long as children are not nearby. For example, parents of a child may be willing to watch a PG-13 or R-rated movie after their child has gone to bed or so long as their child is not in the room.

However, despite an adult's desire to keep a child out of a room while watching a movie or listening to an audio book, it can be difficult to determine whether a child is nearby and whether the digital media content that is being presented should be edited. For example, an adult may repeatedly, and unsuccessfully, scan a room or look at the entrance to a room to ensure a child is not present. In addition, when the adult is not present the child can access the movie or audio book with age inappropriate content.

Furthermore, with the ubiquity of electronic devices, many children use electronic devices, such as smart phones, tablets, laptops, etc. In many instances, with the consent of an adult, the child may be allowed to download content that is age appropriate, such as songs, learning tools, games, movies, etc. However, in some circumstances, a child may inadvertently download or access digital media content with age inappropriate content that is stored in the electronic device, found in a digital media store, or accessed via a network. For example, in some instances, the digital media content may simply be mislabeled.

DETAILED DESCRIPTION

Generally described, aspects of the present disclosure relate to activating one or more content rules based on the presence of a person who does not satisfy a threshold age. More specifically, a device is described that can detect the presence of a child or a person who does not satisfy a threshold age within a predetermined area (e.g., home, television room, etc.) of a media presentation device (e.g., network enabled television, smart phone, tablet, laptop, desktop, projector, digital media receiver, digital media recorder, audio book reader, digital media player, screen, speakers, etc.). Once the child or person who does not satisfy a threshold age is detected within the predetermined area, one or more content rules can be applied to the presentation of the digital media content being presented on the media presentation device so as to protect the child from consuming age inappropriate content.

As a non-limiting example of the present disclosure, Parent1 begins watching a movie with age inappropriate content for children on a network enabled television (TV) in a TV room. The movie can be streamed or downloaded from a remote data store accessible via a network, such as the Internet, or accessed from a local content data store, such as a DVD, Blu-ray disc, solid-state drive, hard-drive, etc. As the movie plays, a content monitoring device in communication with the content data store and the TV monitors for the presence of a child. The content monitoring device can use a variety of methods to detect the child, such as scanning physical characteristics of a person(s) detected within the TV room, or detecting the presence of an electronic device (e.g., phone, tablet, laptop, GPS device, RFID, etc.) associated with a person.

To detect a child by scanning physical characteristics, the content monitoring device can perform a voice, facial, or body scan of a person detected in the room. Based on the scan performed, the content monitoring device can analyze the data collected to determine whether the scanned person is a child. If a voice scan is performed, the content monitoring device can perform a voice analysis on the voice scan data to determine whether the voice belongs to a child. Similarly, for a facial scan, the content monitoring device can perform a facial analysis on the facial scan data to determine whether the face scanned is likely that of a child. As part of the body scan, the content monitoring device can estimate the height and/or body mass of the person to determine whether the person detected in the room is likely a child.

As mentioned, in one embodiment, the content monitoring device can detect the presence of a child by detecting an electronic device associated with the child. In some embodiments, the content monitoring device can detect the presence of the electronic device associated with a child by identifying the location of the electronic device and comparing the location of the electronic device with the location of the TV, the predetermined area, and/or content monitoring device. In certain instances, the content monitoring device can detect a child by communicating with the child's electronic device or by determining that the child's electronic device is connected to a particular network, such as a local Wi-Fi network, local area network (LAN), personal area network (PAN), etc.

With continued reference to the example given above, Child1 carrying his or her smart phone enters the TV room while Parent1 is watching the movie. As mentioned, the content monitoring device can detect the presence of Child1 based on the physical characteristics of Child1 or by detecting Child1's smart phone. Once the content monitoring device detects the presence of Child1, the content monitoring device can apply one or more content rules to the presentation of the movie on the media presentation device, which can alter the presentation of the movie. Continuing with the example given, once Child1 leaves the TV room, the content monitoring device can detect that Child1 has left and cease applying the content rules. Accordingly, normal presentation of the digital media content can resume.

The one or more content rules can alter the presentation of the movie in a variety of ways. For example, the one or more rules can stop or interrupt the movie. Once stopped, the content monitoring device can request an authentication, such as a password, before continuing the movie. In another example, the content monitoring device can also alter the movie. For instance, based on the content rules, the content monitoring device can distort the movie, such as by whiting it out or blacking it out, making the movie fuzzy, or otherwise unintelligible. Furthermore, the content monitoring device can cause a media presentation device, such as a network enabled TV, to skip parts of the movie that have been identified as containing age inappropriate content. In some instances, the content monitoring device can mute the movie either completely or mute the portions of the movie identified as having age inappropriate content. In certain other instances, the content monitoring device can replace what is displayed on the network enabled TV with alternate content, such as a landscape drawing, or other alternate content. In yet other instances, the content monitoring device causes the network enabled TV to display a message indicating that a child is in the TV room.

In addition, Parent1 can setup multiple predetermined areas that use different rules. For example, the TV room may be considered Area 1 and the house may be considered Area 2. The content rules for Area 2 can be different than the content rules of Area 1. For example, when the content monitoring device detects that Child1 has entered the home, the content monitoring device can cause the media presentation device to display a message indicating that Child1 is in the home. When the content monitoring device detects that Child1 has entered the TV room, the content monitoring device can stop the movie or begin altering the age inappropriate content in the movie, as desired.

In another embodiment, the content monitoring device can be used to determine whether a child is the primary user of the media presentation device (e.g., in the case of a smart phone or tablet), or whether the media presentation device is associated with a child. To identify whether a child is the primary user of the media presentation device or the media presentation device is associated with a child, the content monitoring device can determine whether the media presentation device is registered as belonging to or being associated with a child and/or the content monitoring device can analyze the digital media content stored or accessed by the media presentation device.

As part of the registration, a media presentation device can be designated as a child device, adolescent device, adult device, etc. One or more different content rules can be applied to the media presentation device based on the association. For example, if the media presentation device is associated with an adult, no content rules need be applied. If the media presentation device is associated with a child or adolescent varying levels of content rules can be applied as desired.

In one embodiment, the content monitoring device scans the files of the digital media content locally stored by the media presentation device to analyze the digital media content of stored or accessed by the media presentation device. During the scan, the content monitoring device can estimate an age threshold value (or age range) for each of the digital media content files. The estimated age threshold value of each file can be determined based at least in part on genre, language of the content, lyrics, words, rating for content (e.g., G, PG, etc. for movies, "T" for teen, "E" for everyone for video games, etc.), information associated with an account or profile belonging to the user of the file (e.g., age or other demographic information, credit card information, sub-account information, social network information, etc.). In some embodiments, the estimated age of the user of the media presentation devices is then determined as a function (e.g., average, median, etc.) of the estimated age threshold values of each file analyzed. Although described in terms of a media presentation device, it will be understood that the content monitoring device can similarly determine an estimated age of an electronic device.

As a practical example of the above, the content monitoring device can scan digital media content files locally stored in a media presentation device used by Child1. During the scan, the content monitoring device encounters various songs for 5-10 year olds, games for 6-12 year olds and multiplication and spelling learning tools for $4^{th}$-$6^{th}$ graders. As the content monitoring device encounters the different songs, games, and learning tools, the content monitoring device can estimate an age threshold value for each of the different songs, games and learning tools. In this example, the age threshold value estimated for each of the songs is 5-10 years old, the age threshold value estimated for each of the games is 6-12 years old, and the age threshold value estimated for each of the learning tools is 10-12 years old. Based on the age threshold value estimates of the various files, the content monitoring device can estimate the age of the user of the electronic device (Child1) to be between 10 and 12 years old and associate the electronic device with a child. Accordingly, one or more content rules can then be applied to the content presented the media presentation device, which rule(s) can alter the presentation of content on the device when used by the child.

Figure 1:
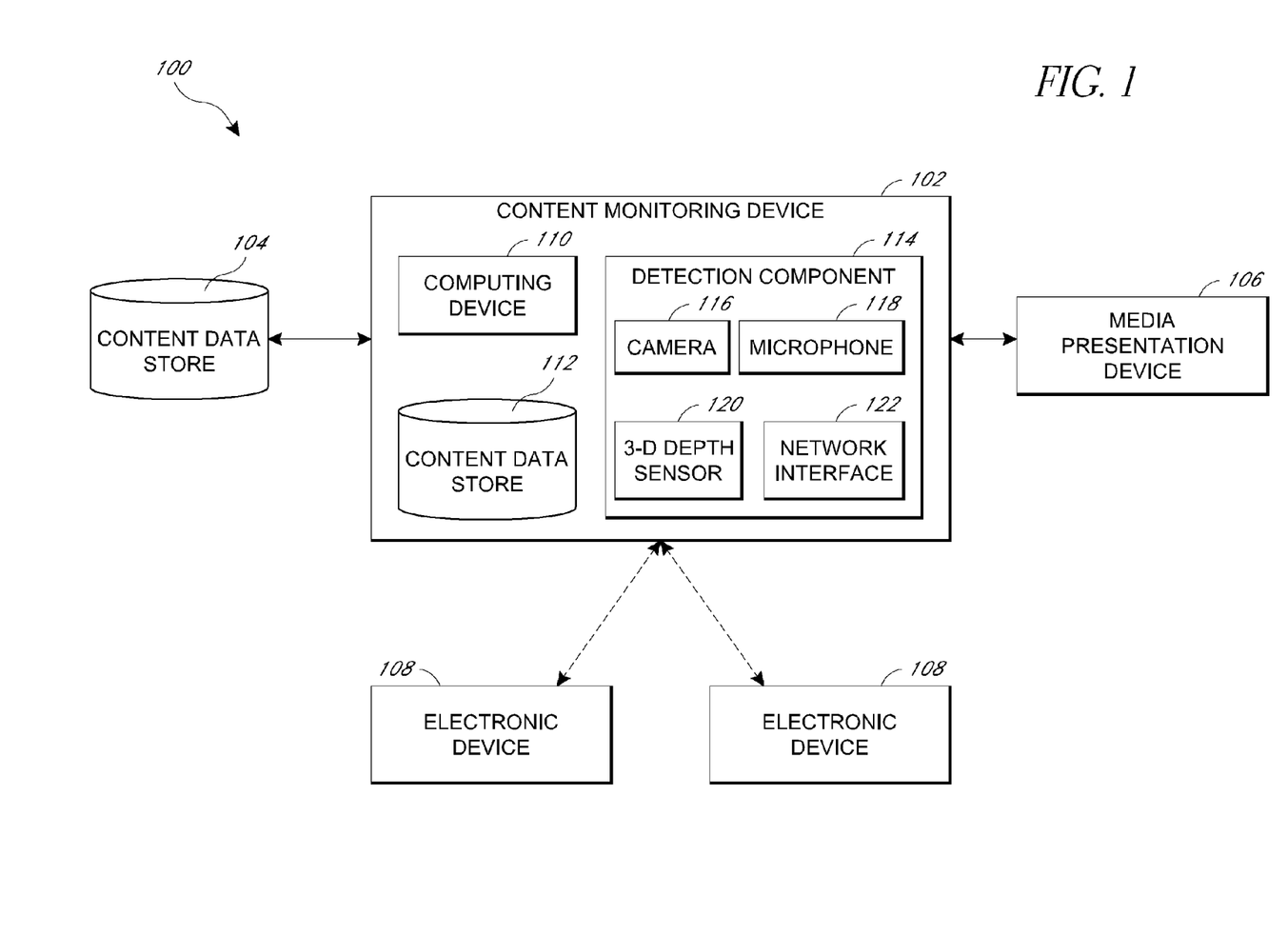
FIG. 1 is a block diagram of a digital media content monitoring environment.

FIG. 1 is a block diagram depicting an illustrative embodiment of a digital media content monitoring environment 100 in which a content monitoring device 102 detects a person within a predetermined area of a media presentation device 106 who does not satisfy a threshold age. Upon detecting the presence of a person who does not satisfy a threshold age, the content monitoring device 102 applies one or more content rules to the presentation of the digital media content, which rules may alter the presentation of the digital media content on the media presentation device 106 so as to make it more difficult for the detected person to consume age inappropriate content.

The predetermined area can be based on the distance between the media presentation device 106 or the content monitoring device 102 and the person or the electronic device 108 associated with the person, or any combination thereof. In some embodiments, the predetermined area can be a room within a house or building, the house or building itself, some other geographic area, or a network, such as, a Wi-Fi network, LAN, or PAN, etc.

In some embodiments, the predetermined area can be based on the manner in which the detection component 114 detects a person. For example, if the detection component 114 detects the presence of one more persons using the cameras 116 or 3-D depth sensors 120, the predetermined area can be the range of the cameras 116 or 3-D depth scanners 120, or some predefined subset. Similarly, if the detection component 114 detects the presence of one more persons using the microphones 118, the predetermined area can be the range of the microphones or some subset of the range.

Furthermore, if the detection component 114 detects the presence of a person based on the detection of an electronic device 108 associated with the person, the predetermined area can be based on the type of technology used to detect the electronic device 108. For example, if the detection component 114 uses Bluetooth to communicate with and/or detect the electronic device 108, the predetermined area can be the range of a PAN created using the Bluetooth devices, or some subset of the PAN. Similarly, if the detection component 114 uses a Wi-Fi to communicate with and/or detect the electronic device 108, the predetermined area can be the range of the Wi-Fi network, or some subset of the Wi-Fi network. Further, if the electronic device 108 is a GPS device, the predetermined area can be based on a predefined distance between the GPS and the content monitoring device 102 and/or the media presentation 106 device. If the electronic device 108 is an RFID tag or similar device, the predetermined area can be based on distance at which the content monitoring device 108 is able to communicate with and/or read data from the RFID tag.

In the illustrated embodiment, the content monitoring device 102 applies the content rules to digital media content obtained or accessed from a content data store 104, which may be local or remote to the content monitoring device 102. The content monitoring device 102 may then alter the digital media content in accordance with the rule(s) and provide the altered content to the media presentation device 106. In other embodiments, the content monitoring device may provide the rule(s) to the media presentation device 106, which, in turn, applies the rule(s) and alters the content for presentation. In the illustrated embodiment, the content monitoring device 102 is also in communication with one or more electronic devices 108 that may belong to persons who also utilize the media presentation device 106. As will be described in more detail below, the content monitoring device 102 may determine that a person within a predetermined area of the media presentation device 106 is a child based at least in part on detecting the presence of an electronic device 108 that is associated with a child. Those skilled in the art will appreciate that an electronic device 108 may itself be or function as a media presentation device.

In the illustrated embodiment, each of the content monitoring device 102, the content data store 104, the media presentation device 106, and the electronic device 108 are depicted as separate and distinct devices. For example, the content data store 104 may be remotely located and associated with a content server or service that downloads or streams digital media content to media presentation devices, such as network enabled TVs, smart phones, laptops, desktops, tablets, etc. In such embodiments, the content monitoring device 102 and/or media presentation device 106 can communicate with the content data store 104 over a network or other communication link. The content monitoring device 102 may communicate with the media presentation device 106 and/or electronic devices 108 via a network or other communication link as well. Accordingly, the content monitoring device 102 may be remote from the media presentation device 106 and/or electronic devices. Such networks may include, but are not limited to, any wired network, wireless network, or combination thereof. In addition, such a network may be a personal area network, local area network, wide area network, cable network, satellite network, cellular telephone network, or combination thereof. For example, the network may be a publicly accessible network of linked networks, possibly operated by various distinct parties, such as the Internet. In some embodiments, the network may be a private or semi-private network, such as a corporate or university intranet. Other communication links may include, but are not limited to, Wi-Fi networks, WiMax networks, short wavelength radio transmissions, etc.

Although depicted in FIG. 1 as discrete devices, those skilled in the art will recognize that any one or more of the content monitoring device 102, the content data store 104, the media presentation device 106, and the electronic device 108 can be implemented as a single device or as separate and distinct devices and/or that the operations or functions of any one of these devices may be shared or distributed across one or more of the other devices. In some embodiments, a single device embodies the functions and/or operations of the content monitoring device 102, the content data store 104, the media presentation device 106, and the electronic device 108. For example, an electronic device 108, such as a smart phone or tablet, can include a content data store (e.g., local memory), a content monitoring device, and a media presentation device (e.g., a display screen and/or speakers). It will be understood that other combinations of the content monitoring device, the content data store, the media presentation device, and the electronic device or their respective functions/operations can be implemented in a device. For example, the content data store 104 can be remote from a single device that includes the content monitoring device and the media presentation device, etc.

As noted above, the content data store 104 can be implemented as a local storage device or remote storage device from the content monitoring device 102 and/or the media presentation device 106. For example, the content data store 104 can be maintained by a third party (such as a storage web service or a content delivery service) or maintained by one more virtual machines implemented in a hosted computing environment. The hosted computing environment may include one or more rapidly provisioned and released computing resources, which computing resources may include computing, networking and/or storage devices. A hosted computing environment may also be referred to as a cloud computing environment. In certain embodiments, the content data store 104 can be a local storage device, such as a harddrive of a computer, a DVD, a Blu-ray disc, solid-date drive, or other non-transitory computer-readable storage device or medium. The digital media content may be streamed or downloaded to the media presentation device 106 for presentation. For example, the content data store 104 can store video, audio, audio/visual files, etc. Accordingly, as the digital media content is streamed from the content data store 104 and presented by the media presentation device 106, the content monitoring device 102 may detect that a person who does not satisfy an age threshold is in the vicinity of the media presentation device 106 and apply the appropriate content rule(s). Accordingly, the content monitoring device 102 can alter (e.g., interrupt, stop, modify, distort, etc.) the digital media content in its entirety or in portions, such as those portions identified as containing age inappropriate content.

The media presentation device 106 can be implemented as one or more devices that can present the digital media content to a person. For example, the media presentation device 106 can include, but is not limited to, a television, disc player, audio book reader, digital media player, phone or smart phone, laptop, desktop, projector, tablet, screen, speakers, computer, etc. The electronic devices 108 can be implemented as one or more devices that can communicate with, or contain information that can be accessed by, the content monitoring device 102, such as, but not limited to, a cell phone, smart phone, laptop (or other computer), digital music player, tablet, GPS device, RFID tag, etc.

The content monitoring device 102 can include a computing device 110, a content rules data store 112 and a detection component 114. The computing device 110 may include a network interface, memory, processing unit, and computer-readable medium drive, all of which may communicate with each other by way of a communication bus. The network interface may provide connectivity over a network to the content data store 104, the media presentation device 106, and/or the electronic devices 108. The processing unit may communicate to and from memory containing program instructions that the processing unit executes in order to operate the content monitoring device 102. The memory may generally include RAM, ROM, and/or other persistent and auxiliary non-transitory computer-readable media.

The detection component 114 can detect the presence of one or more persons within a predetermined area, and can include one or more cameras 116, microphones 118, 3-D depth sensors 120, and/or network interface devices 122, such as a Bluetooth, Wi-Fi, cellular, or radio interface device. The components of the detection component 114 can be used to collect data regarding persons within the predetermined area. For example, the cameras 116 and/or 3-D depth sensors 120 can be used to collect facial scan data and/or body scan data of persons within the predetermined area. The microphones 118 can be used to collect voice scan data of persons within the predetermined area, and the network interface devices 122 can be used to detect the presence of electronic devices 108 within the predetermined area.

The detection component 114 can use the one or more cameras 116, 3-D depth sensors 120, and digital signal processing techniques to detect the face of a person within the predetermined area. Once detected, the detection component 114 can collect facial scan data of the person. The detection component 114 can compare the facial scan data with facial data of one or more persons that is stored within the content data store 104, the content rules data store 112, or elsewhere. The stored facial data can include indications as to the identity of the person. For example, pictures or other facial information can be included as part of the information associated with an account or profile of a user.

Using the stored facial data, the detection component 114 can match the facial scan data with a person. If the facial scan data matches facial data of a person who does not satisfy a threshold age, the detection component 114 can apply content rules from the content rules data store 112 to the presentation of the digital media content. In some embodiments, the detection component 114 can perform a facial analysis of the facial scan data to determine whether characteristics of the analyzed face more closely correspond to facial features of a child, adolescent, teenager, or adult. For example, the detection component 114 can detect the size of the face, nose, ears, the presence of facial hair, etc., to determine the age of the person. Larger faces, noses, ears, and/or the presence of facial hair can be used to determine that the scanned person is an adult.

Similarly, the detection component 114 can use the one or more cameras 116, 3-D depth sensors 120, and digital signal processing techniques to analyze the size of a person within the predetermined area. Upon detecting the person, the detection component 114 can collect body scan data of the person, such as the height and size of the person using the cameras 116 and 3-D depth sensors 120. The detection component 114 can compare the body scan data with body data of one or more persons that is stored within the content data store 104, the content rules data store 112, or elsewhere. For example, height and weight information can be included as part of the information associated with an account or profile of a user. The information associated with an account can also include information as to whether the person is an adult, child, etc.

The detection component 114 can compare the body scan data with the stored body data to determine whether the detected person satisfies a threshold age. In some embodiments, the detection component 114 can compare the body scan data with generally known characteristics of people to detect a person who does not satisfy a threshold age. For example, if the detection component 114 determines that the person scanned is less than five feet, the content monitoring device 102 can apply the content rules in the content rules data store 112 to the presentation of the digital media content In addition, the detection component 114 can use the one or more microphones 118 and digital signal processing techniques to detect the voice of a person within the predetermined area. Upon detecting the voice of a person, the detection component 114 can collect voice scan data of the person. The voice scan data can be compared with one or more voice samples stored within the content data store 104, the content rules data store 112, or elsewhere. The samples can be from different users of the media presentation device 106, such as adults and children that use the media presentation device. Further, the voice samples can be part of the information associated with an account or profile belonging to the persons.

The detection component 114 can compare the stored voice samples with the voice scan data. If the detection component 114 matches the voice scan data with a voice sample of a child, the content monitoring device 102 can apply the content rules in the content rules data store 112 to the presentation of the digital media content. In some embodiments, the detection component 114 can perform a voice analysis of the voice scan data to determine whether characteristics of the voice more closely correspond to an adult's voice or a child's voice. For example, the detection component 114 can analyze the pitch, frequency, and/or tone of the voice to determine whether the voice scan data is likely to be a child or an adult. In some instances, deeper voices can be used to determine that the scanned person is an adult.

Similarly, the detection component 114 can collect and analyze hand scan data and/or foot scan data of a person. The detection component 114 can collect the data using the camera 116 and/or via touch. For example, a person can touch the screen of the media presentation device with their hand. The detection component 114 can compare the hand scan data with stored samples of hand scans. If the detection component 114 matches the hand scan data with a sample from a child, the content monitoring device 102 can apply the content rules in the content rules data store 112 to the presentation of the digital media content. In some embodiments, the detection component 114 can perform a hand analysis of the hand scan data to determine whether characteristics of the hand more closely correspond to an adult's hand or a child's hand. For example, the detection component 114 can analyze the size of the hand and/or finger length to determine whether the hand scan data is likely to be from a child or an adult. The content monitoring device 102 can apply the content rules if the size of the hand and/or finger length does not satisfy a hand size and/or finger size threshold. The detection component 114 can similarly analyze foot scan data or other physical characteristics of a person to determine if the person satisfies a threshold age.

The detection component 114 can use the one or more network interfaces to detect an electronic device 108 in the predetermined area that is associated with a person who does not satisfy the threshold age. The network interfaces can communicate with the electronic devices 108 using a variety of communication standards, such as, but not limited to, Bluetooth, Wi-Fi, WiMax, RFID, short wavelength radio, mobile telecommunication standards, etc. In some embodiments, the electronic devices 108 can provide their location to the content monitoring device 102. The content monitoring device 102 can compare the provided location information with its own location information, the location of the media presentation device 106, and/or the predetermined area to determine whether the electronic device 108 is within the predetermined area. For example the electronic device 108 can be a smart phone and/or GPS unit that provides it location information to the detection component 114.

In some embodiments, the detection component 114 identifies the electronic devices with which it can communicate or that are connected to a particular network, such as a LAN, Wi-Fi network, and/or personal area network (PAN). For example, when a person arrives home they often connect their electronic device 108 with a home network in order to access the Internet, or other network, etc. Similarly, Bluetooth devices that are paired can connect when within range of each other, and RIFD tag readers can read RFID tags when the RFID tag comes within range of the RFID tag reader.

The detection component 114 can identify the electronic devices 108 that connect to the particular network, and determine whether the electronic devices 108 are associated with a person who does not satisfy the threshold age. Upon determining that an electronic device 108 is associated with a person who does not satisfy the threshold age is connected to the particular network, the content monitoring device 102 can apply the content rules to the presentation of the digital media content.

It will be understood that the detection component 114 can use any one or a combination of the techniques described above, or other techniques, to determine that a person who does not satisfy a threshold age is within the predetermined area. In some embodiments, the detection component 114 can detect the electronic device 108 of a person when the electronic device 108 enters the predetermined area. Following the detection of the electronic device 108, the detection component 114 can perform a facial scan, voice scan, and/or body scan of the person to improve the accuracy of the detection. For example, the detection component 114 may detect an electronic device 108 associated with a child, but following a facial, voice, or body scan determine that the person within the predetermined area is an adult. Similarly, the content monitoring device 102 can be configured to account for variations between adults, such as short adults, adults with higher-pitched voices, etc.

Furthermore, it will be understood that factors other than the actual or estimated age of a person can be used to determine whether the person satisfies the threshold age. For example, in some embodiments, an administrator can grant a particular child access to content considered age inappropriate for children and deny an adult access to content considered age appropriate for an adult. For example, an administrator can indicate that a device used by Child1 can access content considered age appropriate for adults and teens (but not age appropriate for children). Similarly, an administrator can indicate that when Child1's facial scan data, voice scan data or other data is detected, Child1 is to be given access to content considered age appropriate for teens and adults, as determined by the administrator. Similarly, an administrator can limit an adult's access to content considered age appropriate for an adult. In certain embodiments, the detection component 114 can receive data indicating that a particular person does not satisfy a threshold age (regardless of the age of the actual person). For example, using a user interface, an administrator can identify a person that does not satisfy a threshold age is within the predetermined area.

As mentioned, the detection component 114 can determine whether a device, such as the electronic device 108 or the media presentation device 106 is associated with a person who does not satisfy a threshold age or a person who does satisfy the threshold age. In some embodiments, the device can be registered with the content monitoring device 102. As part of the registration, the devices can be associated with an adult or child. For example, a smart phone, tablet, GPS device, and/or an RFID tag can be registered with the content monitoring device 102 and be associated with a child. Accordingly, when the child enters the predetermined area with the registered device, the detection component 114 can determine that the device is associated with a child and apply the content rules.

In certain embodiments, to determine whether the user of a device is a person who does not satisfy a threshold age, the detection component 114 can scan a content data store 104 containing digital media content that corresponds to the device or a user. In some embodiments, the scan can occur as part of the process of determining whether the content monitoring device 102 should apply the content rules to the presentation of the digital media content on the media presentation device or to a presentation on the electronic device 108.

As part of the scan, the detection component 114 can estimate an age threshold value for each of the files of the digital media content. In some embodiments, the age threshold value is a number or numerical range. In certain embodiments, the estimated age threshold value is a description, such as "child," "youth," "adolescent," "teenager," "young adult," and/or "adult." Based on the estimated age threshold value of the various files, the detection component 114 can estimate the age threshold value of the device and/or the age of the user. Similar to the estimated age threshold value of each of the digital media content files, the estimated age threshold value of the device or user age, in some embodiments, is a number or numerical range. In certain embodiments, the estimated age threshold value of the device or user age is a description, such as "child," "youth," "adolescent," "teenager," "young adult," and/or "adult." The detection component 114 can determine whether the estimated age threshold value of the device or user age satisfies the threshold age. If the estimated user age does not satisfy the threshold age, the content monitoring device 102 can apply the content rules to a presentation on the media presentation device 106 or on the electronic device 108.

For example, the detection component 114 can scan Smartphone1, which is used by Child1. During the scan, the detection component 114 identifies various children's songs, children's audio books, games, and learning tools. In addition, the detection component 114 can analyze metadata of the various digital media content to determine that the estimated age threshold value of each file of the identified digital media content is 10-12 years old. Using this information, the detection component can estimate that the user for Smartphone1 is 10-12 years old. Accordingly, the content monitoring device 102 can apply content rules to presentations on the Smartphone1 and/or to another device when the Child1 enters a predetermined area.

Conversely during a scan of Tablet1, which is used by Adult1, the detection component 114 identifies various rock and roll songs from the 70's, financial and investment audio books, software programs that provide national and political news, games rated as "Mature," and video files of R-rated movies. Using the metadata of the various files, the detection component 114 estimates an age range of greater than 21 for the rock and roll songs, financial and investment audio books, and software programs that provide national and political news. The detection component 114 also estimates an age range of 15-25 for the game rated as "Mature" and an age range of greater than 17 for the video file of the R-rated movie. Based on the estimated age threshold value of the various files, the content monitoring device 102 can determine that Tablet1 is associated with an adult.

Furthermore, as part of the scan, the detection component 114 can analyze the amount of digital media content with an estimated age threshold value of a child, adolescent, teenager, adult, etc. For example, a parent and child may both use a tablet, smart phone, laptop, etc. Thus, the device may have digital media content with an estimated age threshold value of an adult, as well as digital media content with an estimated age threshold value of a child, teenager, etc.

The detection component 114 can compare the amount of digital media content with different estimated age threshold values to determine whether the user of the device is likely a child or an adult. For example, if 100 files of digital media content are analyzed and 70 files are identified as having age inappropriate content or have an estimated age threshold value of an adult, the detection component 114 can determine that the estimated age threshold value of the device is an adult and/or that the device should be associated with an adult.

In certain embodiments, the detection component 114 associates the device with an adult when there are more files with an estimated age threshold value of an adult than of a child, or when a majority of the scanned files are associated with an adult. For example, in some instances, a device can have various files with an estimated age threshold value of a child, other files with an estimated age threshold value of a teenager, and other files with an estimated age threshold value of an adult. In such instances, the detection component 114 can estimate the age threshold value of the device, or age of the user of the device, based on the estimated age threshold value of the largest number of files. In certain embodiments, the estimated age of the user of the device is determined as a function of the estimated age threshold values of each analyzed file. For example, the estimated age of the user of the device can be determined as the mean, median, and/or mode of the estimated age threshold values for the analyzed files.

In some embodiments, the detection component can analyze the frequency of use of the various media content files to determine the estimated age of the user of the device. For example, if an electronic device 108 includes different files with estimated age threshold values of a child, teenager, and an adult, the detection component 114 can analyze which files are used most frequently to determine the estimated age of the user of the device. The files used most frequently can be based on the number of times the files are accessed, the amount of time the files and/or programs are used, and the like. It will be understood that the number of files identified as the most frequently used can be a predetermined number, such as the top ten, or dynamically determined using a function, such as the files with a use time in the top quartile as compared to the other files, etc.

In some embodiments, the detection component 114 determines an estimated age of the user of the device based on the most recently used files. For example, even though an adult may be the primary user of an electronic device 108, the adult may allow a child to use it in the evenings or on the weekends. Based on the files that are used, the detection component can determine whether a child or an adult is the likely user. The most recently used files can be based on a succession of files that are accessed, an analysis of the most recently accessed files (e.g., average age threshold value of the ten most recently accessed files), amount of time a file that is currently in use has been open, etc. The number of files that constitutes the most recently accessed files can be determined by a user.

As an example, and not to be construed as limiting, if five of the last eight digital media content files accessed have an estimated age threshold value of a child, the detection component 114 can estimate the age of the user of the device as a child and the content monitoring device 102 can begin applying the content rules to the electronic device 108 or to the media presentation device 106. Conversely, if an adult accesses several songs, games, or other programs in succession with an estimated age threshold value of an adult, the detection component 114 can change the estimated age of the user of the device to an adult. In some embodiments, a user can change the estimated age of the user of the electronic device 108/media presentation device manually, such as by entering a passcode, etc.

With continued reference to FIG. 1, the content rules data store 112 can include the rules that specify how the content monitoring device 102 responds once a person who does not satisfy a threshold age is detected within the predetermined area. In some embodiments, the content monitoring device 102 can stop the presentation of the digital media content based on the content rules. For example, the content rules can turn off a TV, stop the play of a streaming or downloaded video, DVD or Blu-ray, stop the play of an audio book, etc.

In certain embodiments, the content monitoring device 102 can alter the presentation of the digital media content based on the content rules. For example, based on the content rules, the content monitoring device 102 can distort the images of a video that is being played so as to make the video unintelligible to a user. In some embodiments, the content monitoring device 102, based on the content rules, can black out or white out the presentation or make it fuzzy. In certain embodiments, based on the content rules, the content monitoring device 102 can skip or mute portions of the presentation that have been identified as containing age inappropriate content. In some embodiments, the content monitoring device 102 can indicate that a child is present.

In some embodiments, the content monitoring device 102 can replace parts of the presentation with alternate content based on the content rules. For example, the content monitoring device 102 can replace the scene of a movie with a landscape drawing or an animal. For audio books, the content monitoring device 102 can replace one or more age inappropriate words with age appropriate words. Similarly, the content monitoring device 102, based on the content rules, can replace one or more sentences or paragraphs of age inappropriate content with a summary of the sentences or paragraphs that are age appropriate.

The age inappropriate content can be identified in a variety of ways. In some embodiments, the age inappropriate content can be identified using metadata of the files. The metadata can identify a particular portion of the file as containing age inappropriate content and the reason for which the content is considered age inappropriate. For example, the metadata can identify the content as age inappropriate due to language, violence, dialogue, drug use, indecency, etc. Accordingly, when the content rules are applied to the presentation of the digital media content, the content monitoring device 102 can monitor the metadata and alter the presentation based on the metadata and the content rules.

In certain embodiments, the age inappropriate content can be identified by comparing words and/or images from the files with a data store containing words and/or images that have been determined to be age inappropriate. Accordingly, when the content rules are applied to the presentation of the digital media content, the content monitoring device 102 can monitor the words and/or images of the digital media content and alter the presentation based at least on the content rules and the comparison of the digital media content with the age inappropriate words and/or images in the data store.

To analyze the digital media content prior to its presentation on the media presentation device, the content monitoring device 102 can use a buffer. For example, the content monitoring device 102 can analyze the digital media content that will be presented on the media presentation device 30 seconds or 1 minute prior to its presentation. When age inappropriate content is identified, the presentation can be altered based on the content rules.

Figure 2A:
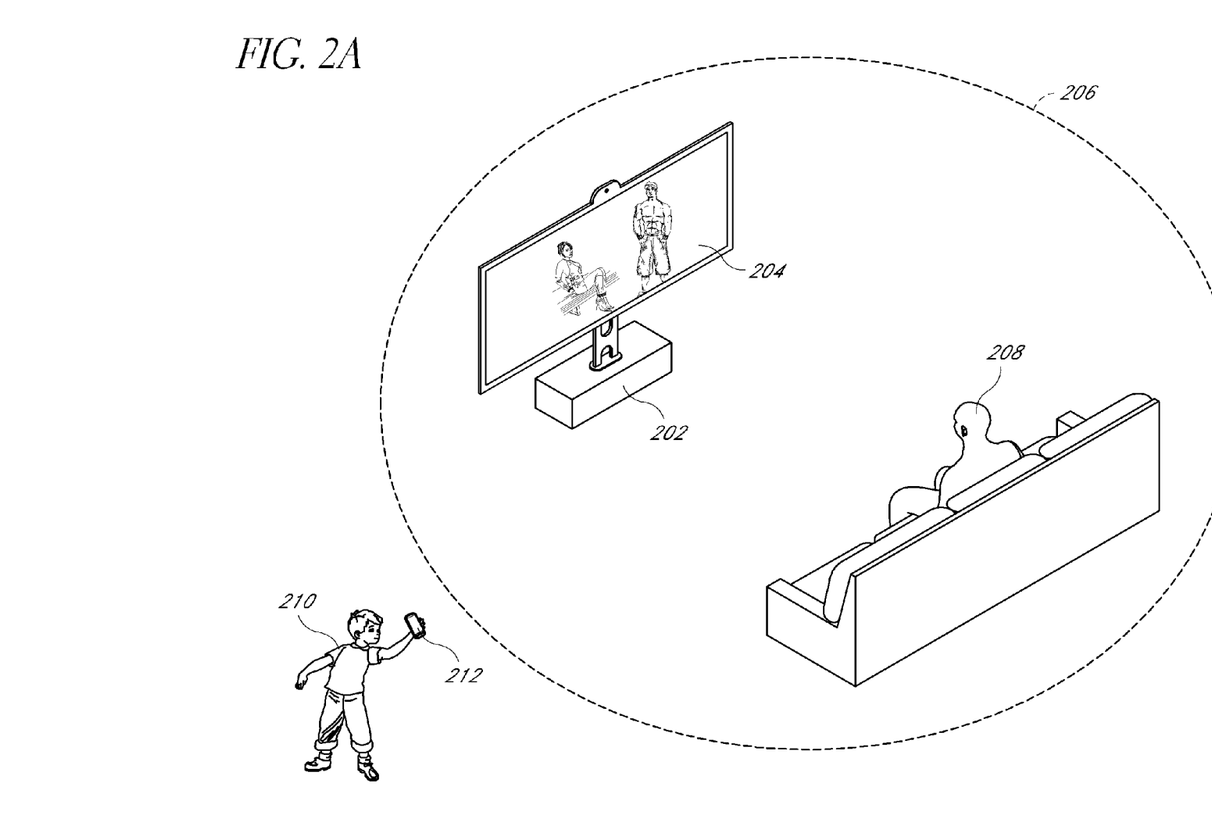
FIGS. 2A and 2B are diagrams illustrative of an embodiment of the digital media content monitoring environment where a content monitoring device detects a person within a predetermined area who does not satisfy a threshold age by detecting an electronic device associated with the person within the predetermined area.
Figure 2B:
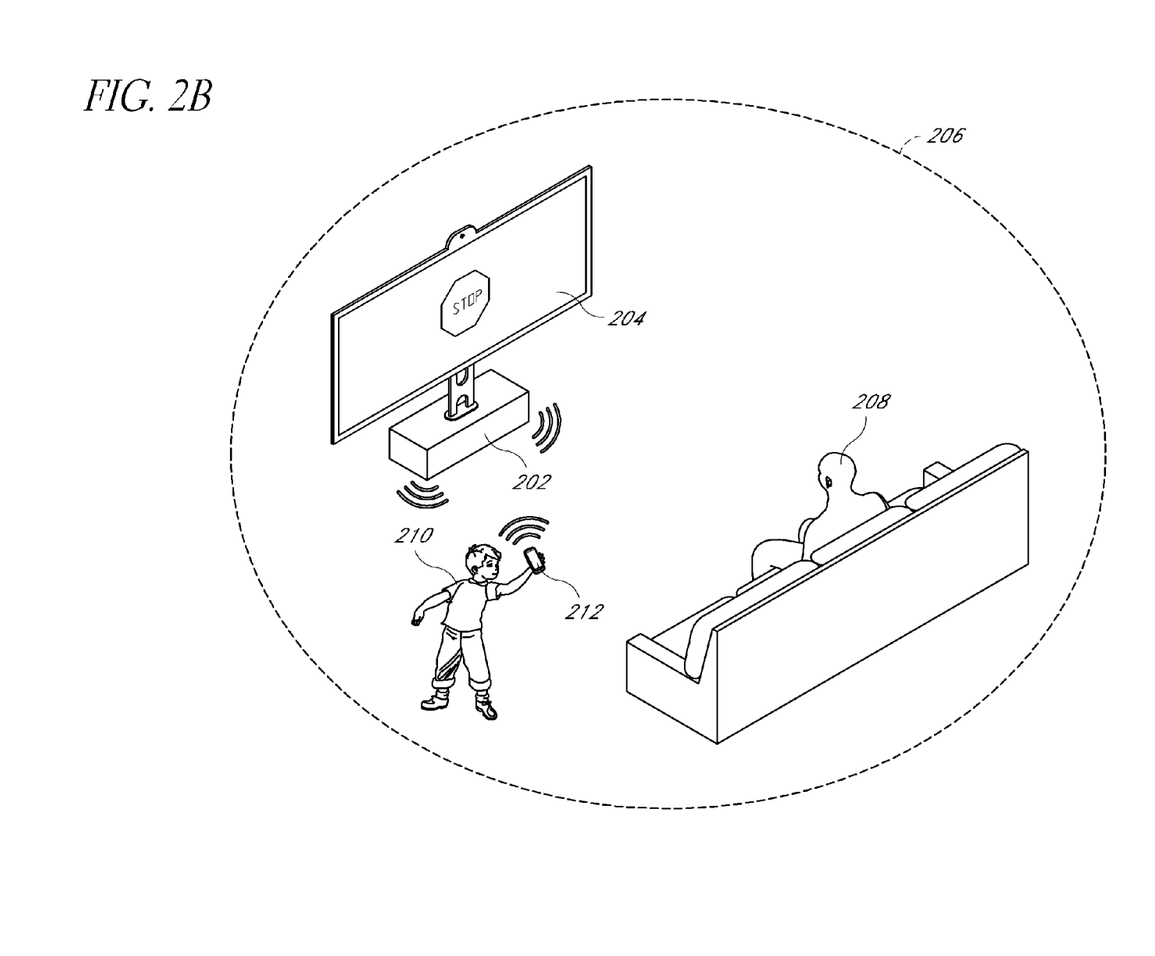
Figure 2C:
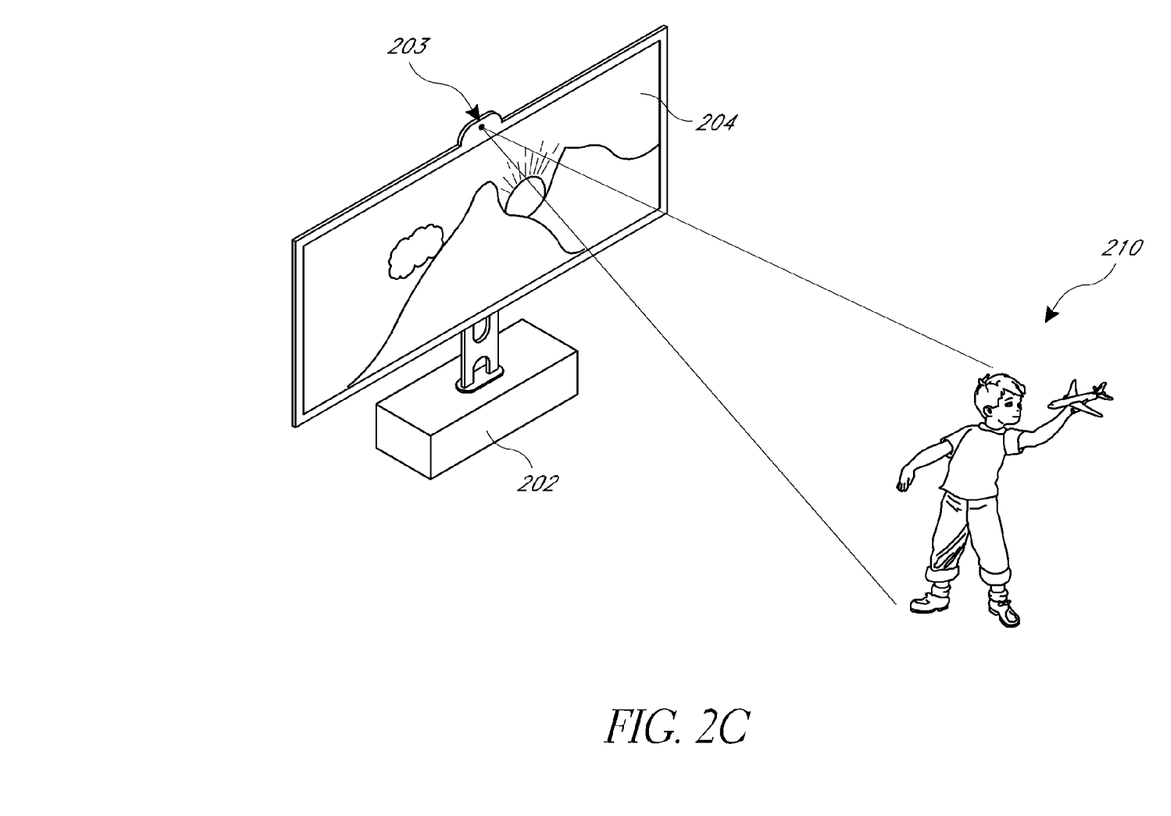
FIGS. 2C-2E are diagrams illustrative of embodiments of the digital media content monitoring environment where a content monitoring device detects a person within a predetermined area who does not satisfy a threshold age based on physical characteristics of the person.
Figure 2D:
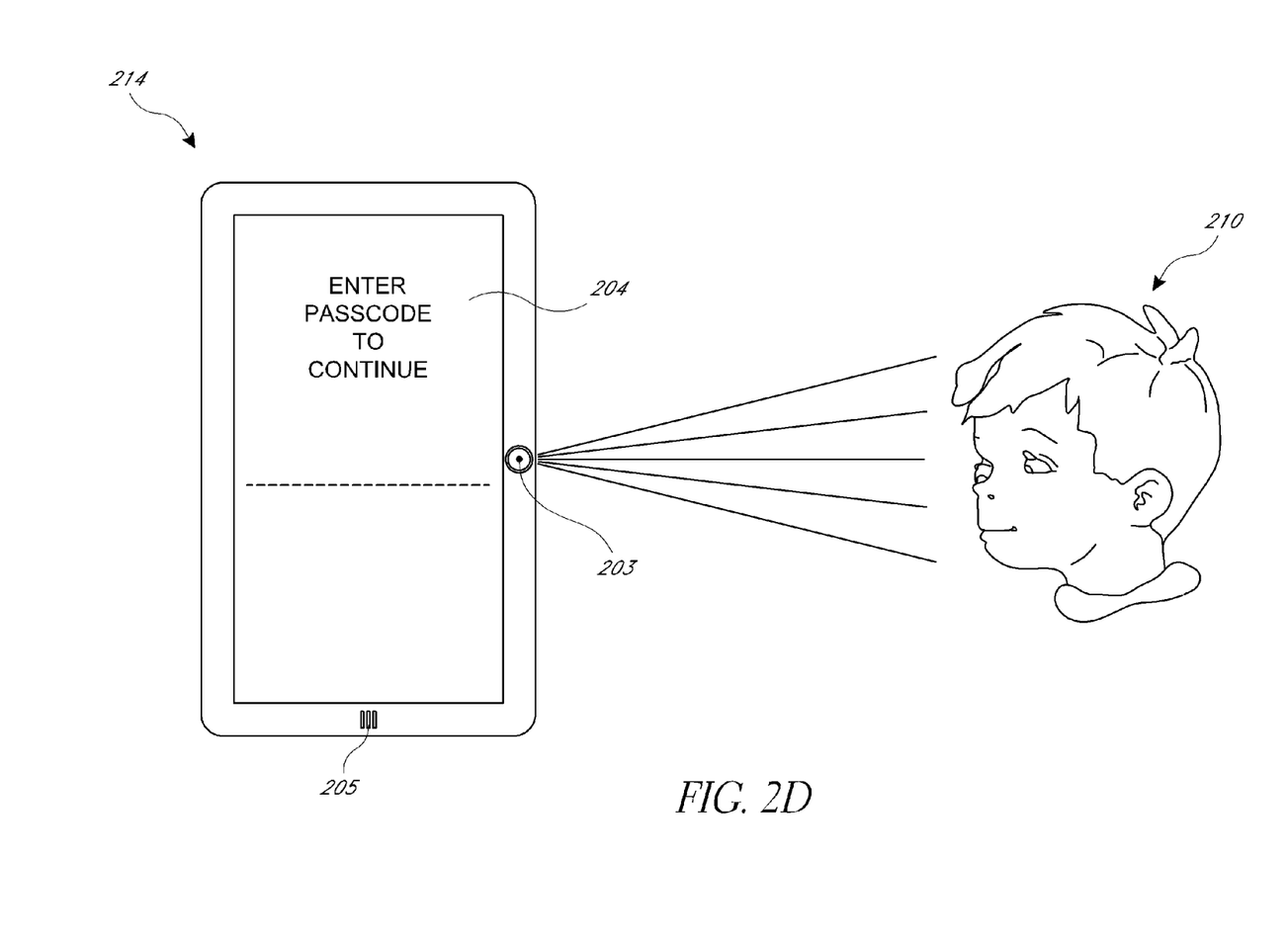
Figure 2E:
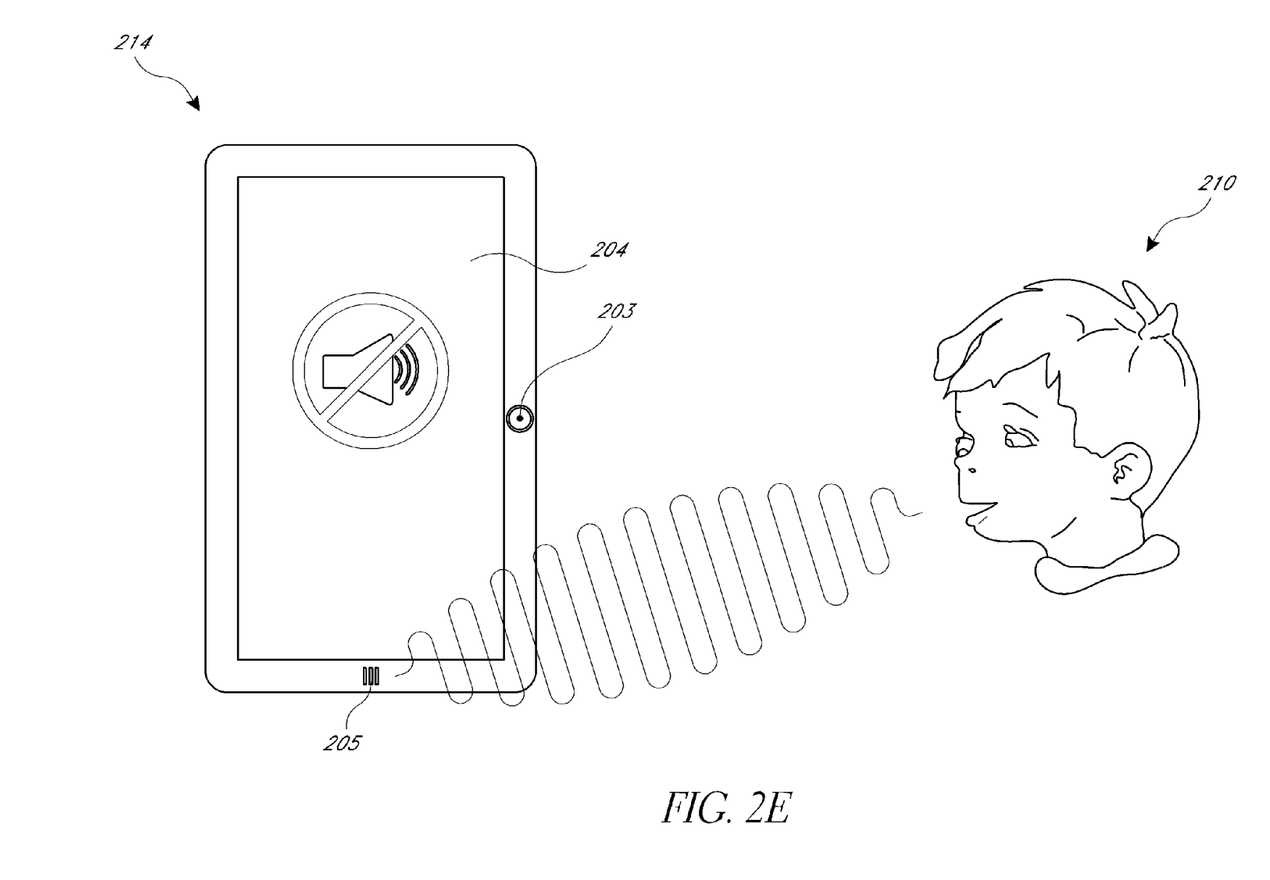

FIGS. 2A-2E are diagrams of illustrative embodiments of a digital media content monitoring environment 200. FIGS. 2A and 2B are diagrams illustrative of an embodiment of the digital media content monitoring environment 200 where a content monitoring device 202, (similar to the content monitoring device 102 described above) detects a person within a predetermined area who does not satisfy a threshold age by detecting an electronic device 212 (similar to the electronic device 108 described above) within the predetermined area that is associated with the person. FIGS. 2C-2E are diagrams illustrative of embodiments of the digital media content monitoring environment 200 where a content monitoring device 202, detects a person within a predetermined area who does not satisfy a threshold age based on physical characteristics of the person.

In the illustrated embodiment of FIG. 2A, an adult 208 is watching a movie with age inappropriate content on a media presentation device (TV 204). As mentioned previously, the movie can be streamed or downloaded from a remote data store accessible via a network, such as the Internet, or accessed from a local content data store, such as a DVD, Blu-ray disc, solid-state drive, hard-drive, etc. As the adult 208 watches the movie, the content monitoring device 202 monitors the predetermined area 206. As described in greater detail above, the predetermined area 206 can be a particular room in a home or building, a home or building, a Wi-Fi network, LAN, PAN, etc. As illustrated, a person 210 holding an electronic device (smart phone 212) is located just outside the predetermined area 206. As the content monitoring device 202 does not detect the smart phone 212 of the person 210 within the predetermined area 206, the adult 208 is able to watch the movie without interruption.

However, in the illustrated embodiment of FIG. 2B, the content monitoring device 202 detects that the smart phone 212 has entered the predetermined area 206, and that the smart phone 212 is associated with a child (person 210). As discussed in greater detail above, in some embodiments, the content monitoring device 202 can detect that the smart phone 212 associated with a child has entered the predetermined area 206 by comparing location information of the smart phone 210 with location information of the content monitoring device 202, the TV 204, and/or predetermined area 206. In certain embodiments, the content monitoring device 202 can detect that the smart phone 212 has entered the predetermined area 206 by determining that the smart phone 212 has connected to a particular network, such as a Wi-Fi network, LAN, PAN, etc. Once the content monitoring device 202 detects that the smart phone 212 has entered the predetermined area 206 and that the smart phone is associated with a child, the content monitoring device 202 applies the content rules to the movie. In the illustrated embodiment, based on the content rules, the content monitoring device 202 stops the movie. Although not illustrated in FIG. 2A, it will be understood that other electronic devices 108 can be used instead of the smart phone 212. For example, as described above, a GPS device, RFID tag, tablet, etc. can be used as the electronic device 108.

In the illustrated embodiment of FIG. 2C, the content monitoring device 202 detects a person 210 within the predetermined area using one or more detection devices, such as a camera 203, 3-D depth sensors, etc. Once detected, body scan data of the person 210 can be collected by the camera 203 and the 3-D depth sensors and used by the content monitoring device 202 to determine various physical characteristics of the person 210. For example, the content monitoring device 202 can determine the height, relative size, and/or body mass of the person 210.

In some embodiments, the content monitoring device 202 can compare the physical characteristics of the person 210 with expected values of a child or of an adult. For example, the content monitoring device 202 can determine a person shorter than 4' 6" is a child. In some embodiments, the content monitoring device 202 compares the body scan data of the person 210 with stored data that is associated with an account of the child or other registered users. If the body scan data matches the stored data that is associated with an account of a child, the content monitoring device 202 determines that the person 210 is a child. As illustrated, once the content monitoring device 202 determines that the person 210 is a child, the content monitoring device 202 applies the content rules. In the illustrated embodiment, based on the content rules, the content monitoring device 202 replaces the digital media content with the scene of a sunset as alternate content.

FIG. 2D is a diagram illustrative of an embodiment of a media presentation device 214 that includes a content monitoring device 102. In the illustrated embodiment, the content monitoring device 102 detects a person who does not satisfy a threshold age within a predetermined area based on a facial scan of the person. Once detected, the camera 203 collects and the content monitoring device 102 analyzes facial scan data of the person 210.

As part of the analysis, the content monitoring device 102 can compare the facial scan data of the person 210 with facial data that has been previously stored, either on the media presentation device 214 or at a remote location. If the facial scan data of the person 210 matches previously stored facial data of a child, the content monitoring device 102 can determine that the person 210 is a child. As described in greater detail above, in some embodiments, the content monitoring device can perform a facial analysis of the facial scan data to determine whether characteristics of the person 210 more closely correspond to facial features of a child or of an adult. In the illustrated embodiment, once the content monitoring device 202 determines that the person 210 is a child, the content monitoring device 102 stops the presentation of the digital media content and requests a passcode before continuing.

FIG. 2E is a diagram illustrative of an embodiment of a media presentation device 214 that includes a content monitoring device 102. In the illustrated embodiment, the content monitoring device 102 detects a person who does not satisfy a threshold age within a predetermined area based on a voice scan of the person. Once detected, the microphone 205 collects and the content monitoring device 102 analyzes voice scan data of the person 210.

As part of the analysis, the content monitoring device 202 can compare the voice scan data of the person 210 with voice data that has been previously stored, either on the electronic device 214 or at a remote location. If the voice scan data of the person 210 matches previously stored voice data of a child, the content monitoring device can determine that the person 210 is a child. As described in greater detail above, in some embodiments, the content monitoring device can perform a voice analysis of the voice scan data to determine whether characteristics of the voice of the person 210 more closely correspond to aural features of a child or of an adult. In the illustrated embodiment, once the content monitoring device 202 determines that the person 210 is a child, the content monitoring device mutes some or all of the presentation of the digital media content.

Figure 3:
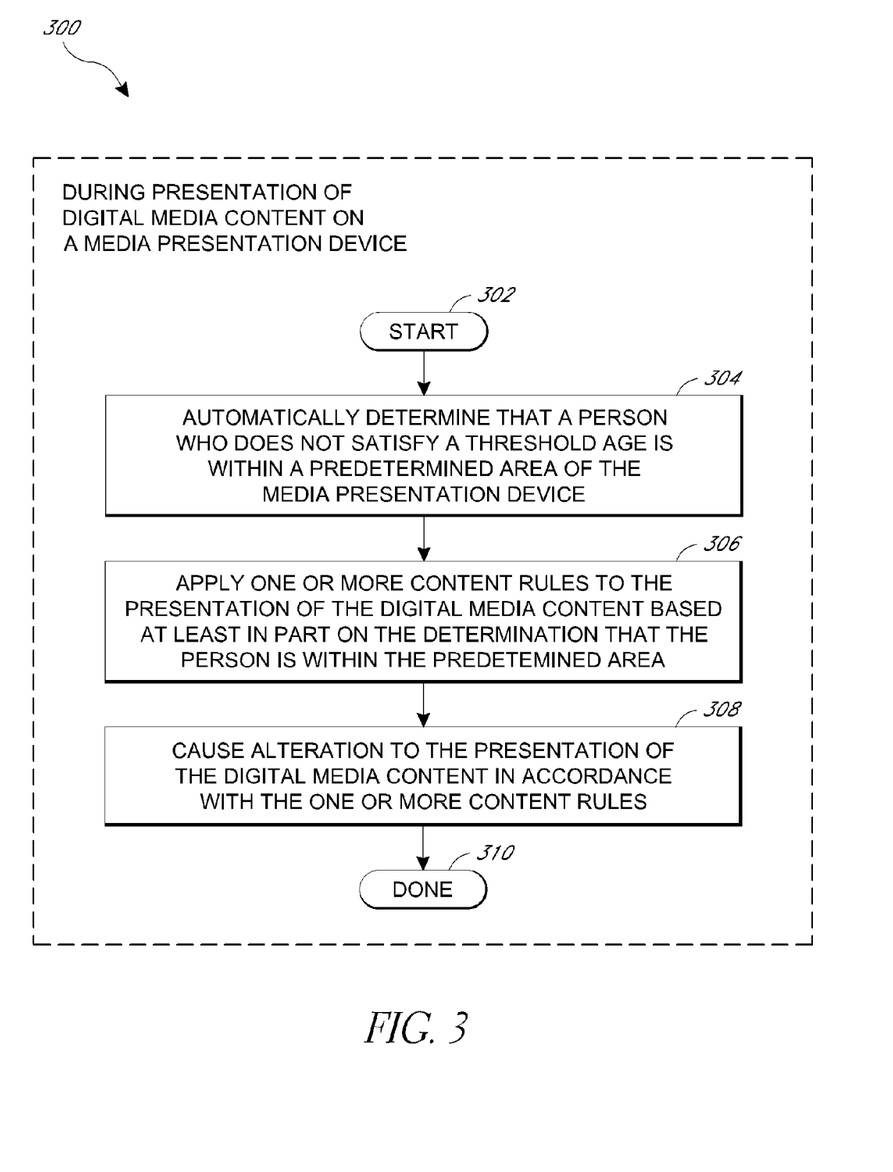
FIG. 3 is a flow diagram of an illustrative routine implemented by a content monitoring device for determining that a person who does not satisfy a threshold age is within a predetermined area.

FIG. 3 is a flow diagram of an illustrative routine 300 implemented by the content monitoring device 102 for determining that a person who does not satisfy a threshold age is within a predetermined area. One skilled in the relevant art will appreciate that the elements outlined for routine 300 may be implemented by one or more computing devices/components that are associated with the content monitoring device 102, described in greater detail above with reference to FIG. 1. For example, routine 300 can be implemented by any one or a combination of, the computing device 110, the content rules data store 112, the detection component 114, and the like. Accordingly, routine 300 has been logically associated as being generally performed by the content monitoring device 102, and the following illustrated embodiment should not be construed as limiting.

At block 302 the content monitoring device 102 initiates the routine 300 during presentation on a media presentation device 106 of digital media content. The digital media content can include any digital media content, such as, but not limited to videos, music, audio recordings, etc. For example, the routine 300 can be initiated while a person is viewing a movie on a TV, or listening to a song or audio book on a digital media player, etc.

Further, the digital media content can be stored in a content data store 104 that is local to, or remotely located from, the media presentation device 106 and/or the content monitoring device 102. For example, in some embodiments, the digital media content is stored on a remote content data store over a network, such as the Internet. In certain embodiments, the digital media content can be stored on a local content data store, such as a DVD, Blu-ray disc, video cassette, hard-drive, solid-state drive, etc.

At block 304, the content monitoring device 102 automatically determines that a person who does not satisfy a threshold age is within a predetermined area of the media presentation device 106. A user of the media presentation device 106, such as the owner, parent, etc., can determine the threshold age and the predetermined area associated with the decision block 306. For example, a parent can determine what content is age appropriate for a child. Similarly, a parent can determine that the content rules should be applied when the content monitoring device 102 determines that a child is in the same room as or is within 20 feet of the media presentation device. Accordingly, when the content monitoring device 102 detects a person within the predetermined area, the content monitoring device 102 can automatically determine whether that person does not satisfy the threshold age.

As discussed in greater detail above, with reference to FIGS. 1 and 2A-2E, the content monitoring device can automatically determine that a person who does not satisfy the threshold age is within the predetermined area by scanning physical characteristics of one or more persons detected within the predetermined area and/or or detecting the presence of an electronic device within the predetermined area that is associated with the person who does not satisfy the threshold age. Further, the content monitoring device 102 can use multiple physical characteristics and/or the detection of the electronic device to determine that the person who does not satisfy the threshold age is within the predetermined area.

At block 306, the content monitoring device 102 applies one or more content rules to the presentation of the digital media content based at least in part on the determination that the person who does not satisfy the threshold age is within the predetermined area. As described in greater detail above, the content rules can be selected by a user, such as a parent or adult, and can prescribe how the content monitoring device 102 will alter the presentation of the digital media content.

At block 308, the content monitoring device 102 causes alterations to the presentation of the digital media content in accordance with the one or more content rules. As discussed in greater detail above, with reference to FIGS. 1 and 2A-2E, the content monitoring device 102 can cause the presentation to be altered in a variety of ways. For example, the content monitoring device 102 can stop, interrupt, distort, skip, mute and/or replace the presentation or portions thereof identified as age inappropriate content based on the content rules. At block 310, the routine 300 ends.

Additional, fewer, or different blocks can be used as part of the routine 300. For example, the content monitoring device 102 can monitor multiple predetermined areas and apply different rules based on the location of the person who does not satisfy the threshold age within the multiple predetermined areas. For example, a home may be one predetermined area and a TV room may be another predetermined area. Similarly, a Wi-Fi network in a home may be one predetermined area and a PAN that includes the content monitoring device 102 can be a second predetermined area. When the content monitoring device 102 determines that the person who does not satisfy the threshold age is within the first predetermined area, it can apply a first set of rules to the presentation of the digital media content. For example, the content monitoring device 102 can alert an adult watching a movie or listening to an audio book that a child has entered the house or connected to the Wi-Fi network. Once the content monitoring device detects a person in the second predetermined area who does not satisfy the threshold age, it can apply a second set of content rules. For example, the content monitoring device 102 can stop the movie or audio book, or begin skipping, muting, blacking out, or otherwise altering portions identified as containing age inappropriate content, as described in greater detail above.

In addition, the content monitoring device 102 can detect when the person who does not satisfy the threshold age has left the predetermined area. Upon determining that the person who does not satisfy the threshold age has left the predetermined area, the content monitoring device can cease application of the content rules to the presentation.

Furthermore, although described in terms of applying content rules to when a person within a predetermined area does not satisfy a threshold age, it will be understood that the embodiments described above can also be used to protect secure, sensitive, and/or confidential information from an unauthorized person or persons. The content monitoring device 102 can determine that the information is sensitive based on the metadata of the files, a comparison of words and/or images in the files with a data store including words and/or images determined to be sensitive, or an identification by a user. Further, the content monitoring device 102 can detect and identify the unauthorized person using the techniques described above with respect to identifying a person who does not satisfy a threshold age. For example, the content monitoring device 102 can determine a person is unauthorized based on physical characteristics of the person and/or by detecting an electronic device that is associated with the unauthorized person, as described in greater detail above. Further, if the content monitoring device 102 detects an unauthorized person within the predetermined area during presentation of confidential information, the content monitoring device can apply one or more content rules to the presentation of the information. For example, based on the content rules, the content monitoring device 102 can alter, stop, distort, skip, mute, and/or replace the confidential information, or portions thereof.

Figure 4:
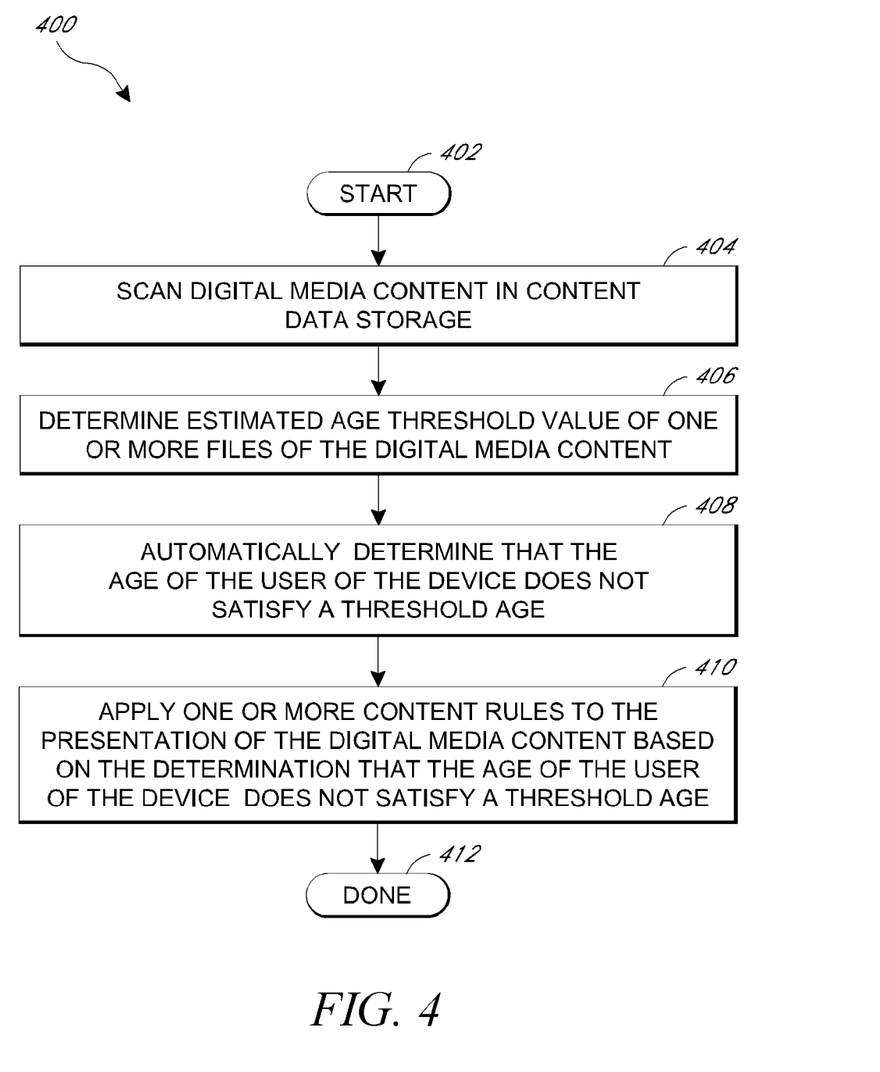
FIG. 4 is a flow diagram of an illustrative routine implemented by a content monitoring device for identifying a device that is associated with a person who does not satisfy a threshold age.

FIG. 4 is a flow diagram of an illustrative routine 400 implemented by the content monitoring device 102 for identifying a device that is associated with a person who does not satisfy a threshold age. One skilled in the relevant art will appreciate that the elements outlined for routine 400 may be implemented by one or more computing devices/components that are associated with the content monitoring device 102, described in greater detail above with reference to FIG. 1. For example routine 400 can be implemented by any one, or combination of, the computing device 110, the content rule data store 112, and/or the detection component 114. Accordingly routine 400 has been logically associated as being generally performed by the content monitoring device 102, and the following illustrative embodiment should not be construed as limiting.

At block 402, the content monitoring device 102 initiates the routine 400. At block 404, the content monitoring device 102 scans digital media content stored on a content data store 104 that is associated with an electronic device 108 or a media presentation device 106. As mentioned previously, the content data store 104 can be located remotely or locally from the device that is scanned.

In some instances, such as when the content data store 104 is remotely located, the content monitoring device 102 can scan the digital media content in the content data store 104 that is associated with a particular user(s) of the device. For example, the remotely located content data store 104 may include digital media content for hundreds or thousands of users. Accordingly, the content monitoring device 102 can scan the digital media content that is associated with the particular user(s) of the device (e.g., the digital media content purchased and/or accessed by the user). In some instances, such as when the content data store 104 is located locally, the content monitoring device 102 can scan all of the digital media content in the content data store 104.

At block 406, the content monitoring device 102 determines an estimated age threshold value of each of the one or more files of the digital media content stored on the content data store 104. In some embodiments, the age threshold value is a number or numerical range. In certain embodiments, the estimated age threshold value is a description, such as "child," "youth," "adolescent," "teenager," "young adult," and/or "adult." The estimated age threshold value of each file can be determined based at least in part on genre, language of the content, lyrics, words, rating for content (e.g., G, PG, etc. for movies, "T" for teen, "E" for everyone for video games, etc.), information associated with an account or profile belonging to the user of the device (e.g., age or other demographic information, credit card information, sub-account information, social network information, etc.). For example, if the digital media content is identified as being one or more children's songs, the content monitoring device 102 can determine an estimated age threshold value of 5-10, or "child" for the children's songs. Similarly, if the content monitoring device 102 identifies one or more files of the digital media content as being R-rated movies, the content monitoring device 102 can determine an estimated age threshold value of 18 years, or "adult" for the R-rated movie. In addition, the length, complexity, or obscurity of the words in the files can be used to determine the estimated age threshold value of the file. For example, large, complex, or obscure words can be rated as "adult," while simple, frequently used words can be rated as "child." Based on the frequency of the "adult" words, the file can be given an estimated age threshold value of an "adult" or "child." For example, if a large number of "adult" words are used, the filed can be given an estimated age threshold value of "adult." Conversely, if there are few or no "adult" words, the file can be given an estimated age threshold value of "child," etc.

At block 408, the content monitoring device 102 automatically determines that an estimated age of the user of the device does not satisfy a threshold age based at least in part on the estimated age threshold value of the one or more files of the digital media content. As described in greater detail above with reference to FIG. 1, the estimated age of the device can be determined after analyzing the number of files identified for each age threshold value, the most recently used files, the frequency of use of the files, etc. For example, if the majority of the files have an estimated age threshold value of 30 or "adult," the content monitoring device 102 can determine that the device is associated with an adult. In some embodiments, if the most recently used files are files have an estimated age threshold value of 10-12 years old or "adolescent," the content monitoring device 102 can determine that the estimated age of the user of the device is an adolescent. In certain embodiments, if the most frequently used files have an estimated age threshold value of 5-8 years old or "child," the content monitoring device 102 can determine that the estimated age of the user of the device is a child.

At block 410, the content monitoring device 102 applies one or more content rules to a presentation of digital media content based at least in part on the determination that the estimated age of the user of the device does not satisfy a threshold age. As described in greater detail above, the content monitoring device 102 can alter, stop, interrupt, distort, skip, mute and/or replace the presentation of the digital media content, or portions thereof, based on the content rules.

The routine 400 can include additional, fewer or different blocks than those described above. For example, the content monitoring device 102 can block access to one or more files of digital media content based on the content rules. For example, if a user tries to access digital media content that includes age inappropriate content, the content monitoring device 102 can ignore the request, provide a message indicating that the digital media content contains age inappropriate content, request authentication before proceeding, alert another user, initiate an alarm, etc.

All of the processes described herein may be embodied in, and fully automated via, software code modules executed by one or more general purpose computers or processors. The code modules may be stored in any type of computer-readable medium or other computer storage device. Some or all the methods may alternatively be embodied in specialized computer hardware. In addition, the components referred to herein may be implemented in hardware, software, firmware or a combination thereof.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Conjunctive language such as the phrase "at least one of X, Y and Z," unless specifically stated otherwise, is otherwise understood with the context as used in general to convey that an item, term, etc. may be either X, Y or Z, or a combination thereof. Thus, such conjunctive language is not generally intended to imply that certain embodiments require at least one of X, at least one of Y and at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A computer-implemented method, comprising:
   under control of one or more computing devices configured with specific computer-executable instructions,
   scanning a plurality of content items stored in a content data store of a media presentation device;
   determining age categorization of each of the plurality of content items based at least on an age-related rating within metadata of each of the plurality of content items, wherein the age categorization of each of the plurality of content items corresponds to at least one of a first age categorization or a second age categorization;
   identifying a first portion, of the plurality of content items, that is associated with the first age categorization;
   identifying a second portion, of the plurality of content items, that is associated with the second age categorization;
   determining that a ratio, representing a number of content items within the first portion in comparison to a number of content items within the second portion, satisfies a threshold value;
   assigning the first age categorization as an estimated user age for the media presentation device; and
   applying one or more content rules associated with the first age categorization to a presentation of a content item of the plurality of content items on the media presentation device, wherein the one or more rules cause alteration of the presentation of the content item.

2. A computer-implemented method, comprising:
   under control of one or more computing devices configured with specific computer-executable instructions,
   scanning a plurality of items of digital media content stored in one or more content data stores associated with a media presentation device;
   determining an age categorization of each of the plurality of items, wherein the age categorization of each of the plurality of content items corresponds to at least one of a first age categorization or a second age categorization;
   identifying a first portion of the plurality of items associated with the first age categorization and a second portion of the plurality of items associated with the second age categorization;
   determining that a ratio, representing a number of items within the first portion in comparison to a number of items within the second portion, satisfies a threshold value;
   assigning the first age categorization as an estimated user age for the media presentation device and
   applying one or more content rules associated with the first age categorization to a presentation of an item of the plurality of items of digital media content on the media presentation device, wherein the one or more rules cause alteration of the presentation of the item.

3. The computer-implemented method of claim 2, wherein the age categorization of at least one item of the plurality of items is determined from a genre of the at least one item.

4. The computer-implemented method of claim 2, wherein the age categorization of at least one item of the plurality of items is determined from words within the at least one item.

5. The computer-implemented method of claim 2, wherein the age categorization of at least one item of the plurality of items is determined from a content rating of the at least one item.

6. The computer-implemented method of claim 2, wherein assigning the first age categorization as the estimated user age for the media presentation device further comprises:
   determining that the first portion of the plurality of items that are associated with the first age categorization has been accessed more frequently than the second portion of the plurality of items that are associated with the second age categorization; and
   wherein assigning the first age categorization as the estimated user age for the media presentation device is in response to said determining.

7. The computer-implemented method of claim 2, wherein assigning the first age categorization as the estimated user age for the media presentation device further comprises:
   determining that the first portion of the plurality of items that are associated with the first age categorization has been accessed more recently than the second portion of the plurality of items that are associated with the second age categorization; and
   wherein assigning the first age categorization as the estimated user age for the media presentation device is in response to said determining.

8. The computer-implemented method of claim 2, wherein alteration of the presentation of the item comprises at least one of:
   issuance of an indication that a person associated with the first age categorization is present;
   skipping one or more portions of the item that are considered inappropriate for the person associated with the first age categorization;
   distorting presentation of the one more portions of the item that are considered inappropriate for the person associated with the first age categorization;
   muting aural presentation of one or more portions of the item that are considered inappropriate for the person associated with the first age categorization;
   modifying visual presentation of one or more portions of the item that are considered inappropriate for the person associated with the first age categorization; and
   replacing, with alternate content, one or more portions of the item that are considered inappropriate for the person associated with the first age categorization.

9. A system comprising:
   one or more content data stores configured to store a plurality of items of digital media content associated with a user; and a computing device in communication with the one or more data stores, the computing device including a processor and a memory and configured to:
- determine an age categorization each of the plurality of items, wherein the age categorization of each of the plurality of content items corresponds to at least one of a first age categorization or a second age categorization;
- identify a first portion of the plurality of items associated with the first age categorization and a second portion of the plurality of items associated with the second age categorization;
- determine that a ratio, representing a number of items within the first portion in comparison to a number of items within the second portion, satisfies a threshold value; and
- apply one or more content rules associated with the first age categorization to a presentation of an item of the plurality of items of digital media content, wherein the one or more rules cause alteration of the presentation of the item.

10. The system of claim 9, wherein the age categorization of at least one item of the plurality of items is determined from a genre of the at least one item.

11. The system of claim 9, wherein the age categorization of at least one item of the plurality of items determined from words within the at least one item.

12. The system of claim 9, wherein age categorization of at least one item of the plurality of items is determined from a content rating of the at least one item.

13. The system of claim 9, wherein the computing device is further configured to determine that an access frequency associated with the first portion satisfies a threshold value.

14. The system of claim 9, wherein the computing device is further configured to determine that at least one item from the first portion of the plurality of items was recently accessed by a user of the computing device.

15. The system of claim 9, wherein alteration of the presentation of the item comprises at least one of:
- issuance of an indication that a person associated with the first age categorization is present;
- skipping one or more portions of the item that are considered inappropriate for the person associated with the first age categorization;
- distorting presentation of the one more portions of the item that are considered inappropriate for the person associated with the first age categorization;
- muting aural presentation of one or more portions of the item that are considered inappropriate for the person associated with the first age categorization;
- modifying visual presentation of one or more portions of the item that are considered inappropriate for the person associated with the first age categorization; and
- replacing, with alternate content, one or more portions of the item that are considered inappropriate for the person associated with the first age categorization.

16. A computer-readable, non-transitory storage medium having one or more computer-executable modules, the one or more computer-executable modules comprising:

a first module that, when executed by a computing system in communication with one or more content data stores comprising a plurality of items of digital media content causes the computing system to:
- determine an age categorization each of the plurality of items, wherein the age categorization of each of the plurality of content items corresponds to at least one of a first age categorization or a second age categorization;
- identify a first portion of the plurality of items associated with the first age categorization and the second portion of the plurality of items associated with a second age categorization;
- determine that a ratio, representing a number of items within the first portion in comparison to a number of items within the second portion, satisfies a threshold value; and
- apply one or more content rules associated with the first age categorization to a presentation of an item of the plurality of items of digital media content on the media presentation device, wherein the one or more rules cause alteration of the presentation of the item.

17. The computer-readable, non-transitory storage medium of claim 16, wherein the age categorization of at least one item of the plurality of items is determined from at least one of genre associated with the at least one item, words within the at least one item, and a content rating of the at least one item.

18. The computer-readable, non-transitory storage medium of claim 16, wherein the first module further causes the computing system to at least one of:
- determine that an access frequency associated with the first portion satisfies a threshold value; and
- determine that at least one item from the first portion of the plurality of items was recently accessed by a user of the computing device.

19. The computer-readable, non-transitory storage medium of claim 16, wherein alteration of the presentation of the item comprises at least one of:
- issuance of an indication that a person associated with the first age categorization is present;
- skipping one or more portions of the item that are considered inappropriate for the person associated with the first age categorization;
- distorting presentation of the one more portions of the item that are considered inappropriate for the person associated with the first age categorization;
- muting aural presentation of one or more portions of the item that are considered inappropriate for the person associated with the first age categorization;
- modifying visual presentation of one or more portions of item that are considered inappropriate for the person associated with the first age categorization; and
- replacing, with alternate content, one or more portions of the item that are considered inappropriate for the person associated with the first age categorization.

* * * * *